United States Patent
Aikawa et al.

(10) Patent No.: US 8,099,604 B2
(45) Date of Patent: Jan. 17, 2012

(54) COMMUNICATION SYSTEM, METHOD FOR TRANSFERRING INFORMATION, AND INFORMATION-COMMUNICATION DEVICE

(75) Inventors: Makoto Aikawa, Sagamihara (JP); Shinichiro Fukushima, Yokohama (JP); Hiroyuki Higaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 694 days.

(21) Appl. No.: 12/188,432

(22) Filed: Aug. 8, 2008

(65) Prior Publication Data
US 2009/0064296 A1    Mar. 5, 2009

(30) Foreign Application Priority Data
Aug. 30, 2007 (JP) ................. 2007-223568

(51) Int. Cl.
G06F 21/00 (2006.01)
H04L 9/32 (2006.01)
(52) U.S. Cl. ............... 713/186; 713/169; 713/171
(58) Field of Classification Search ............ 713/169, 713/171, 186
See application file for complete search history.

(56) References Cited

U.S. PATENT DOCUMENTS

| | | |
|---|---|---|
| 2003/0129965 A1 | 7/2003 | Siegel |
| 2005/0152606 A1 | 7/2005 | Wood |
| 2006/0080525 A1 | 4/2006 | Ritter et al. |
| 2006/0236119 A1 | 10/2006 | Bobbitt |
| 2007/0092112 A1 | 4/2007 | Awatsu et al. |

FOREIGN PATENT DOCUMENTS

WO    03/077082 A2    9/2003

*Primary Examiner* — Philip Chea
(74) *Attorney, Agent, or Firm* — Mattingly & Malur, PC

(57) ABSTRACT

A first information-communication device generates first biometric pattern used for comparison based on user biometric information retrieved by a biometric sensor, and sends the generated first biometric pattern to a second biometric information-communication device. The second information-communication device compares the first biometric pattern sent from the first information-communication device with second biometric pattern, which is user biometric pattern stored in memory, and sends the second biometric pattern to the first information-communication device when the compared biometric pattern matches. The first information-communication device then stores the second biometric pattern sent from the second information-communication device.

16 Claims, 13 Drawing Sheets

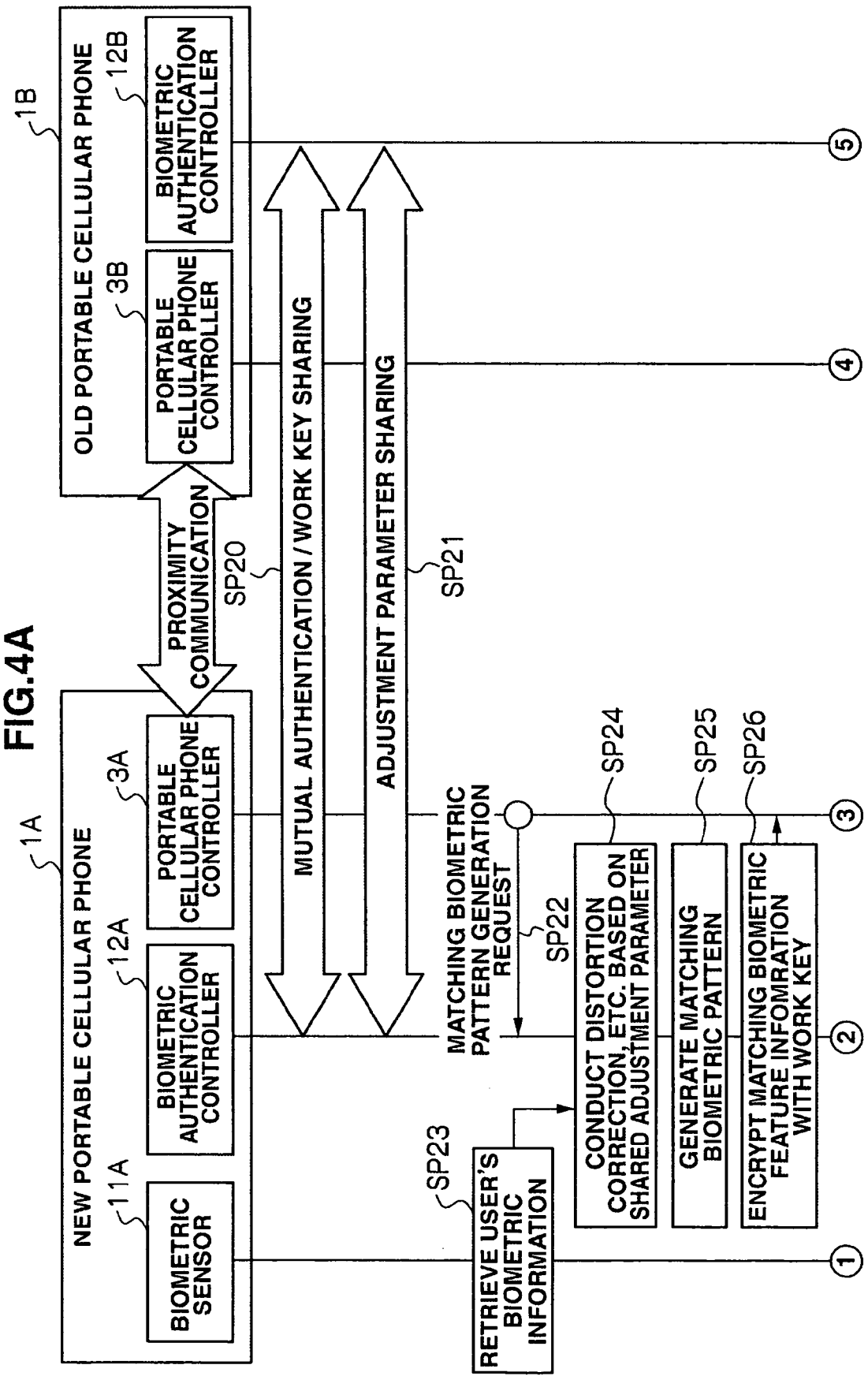

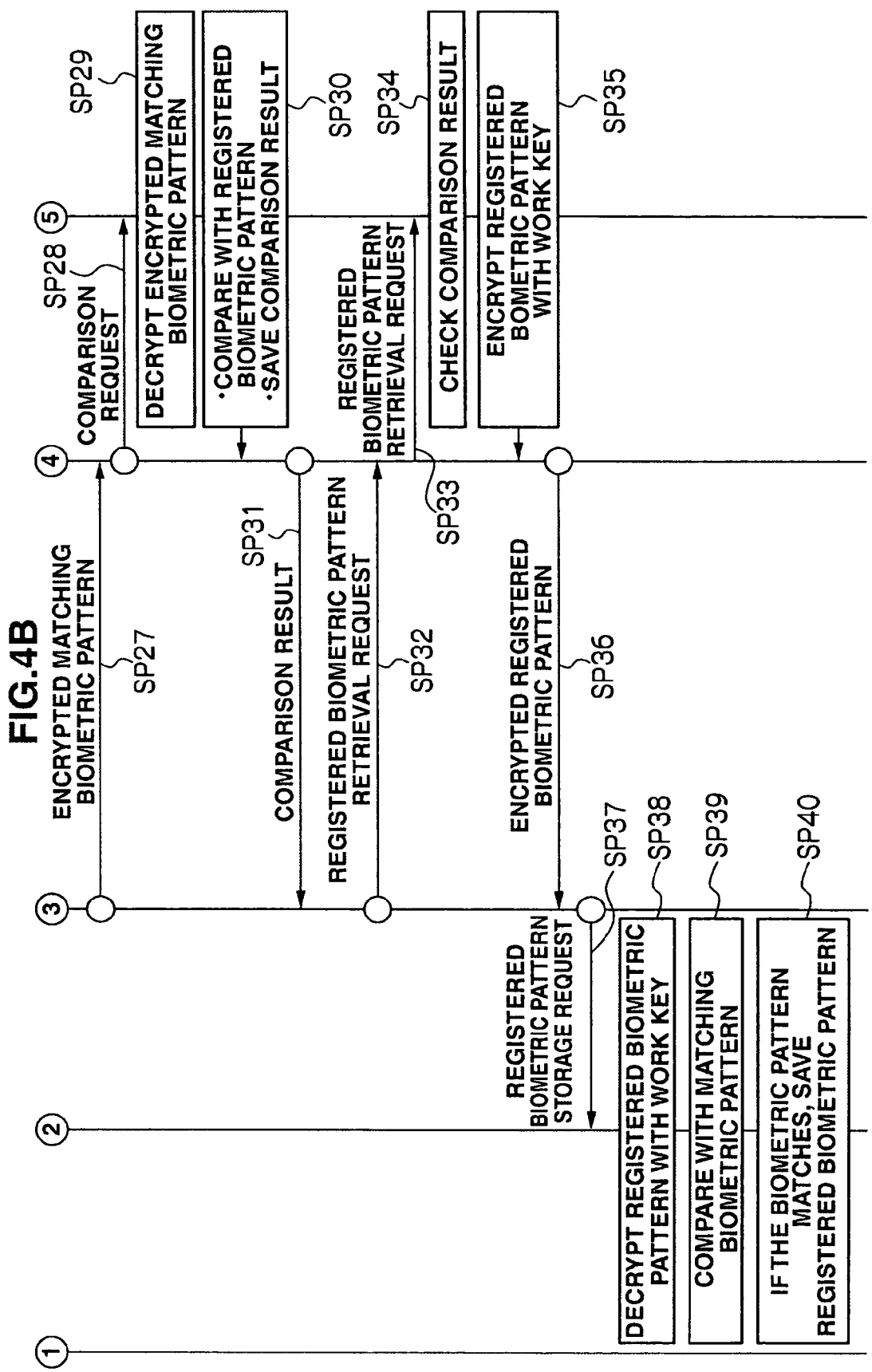

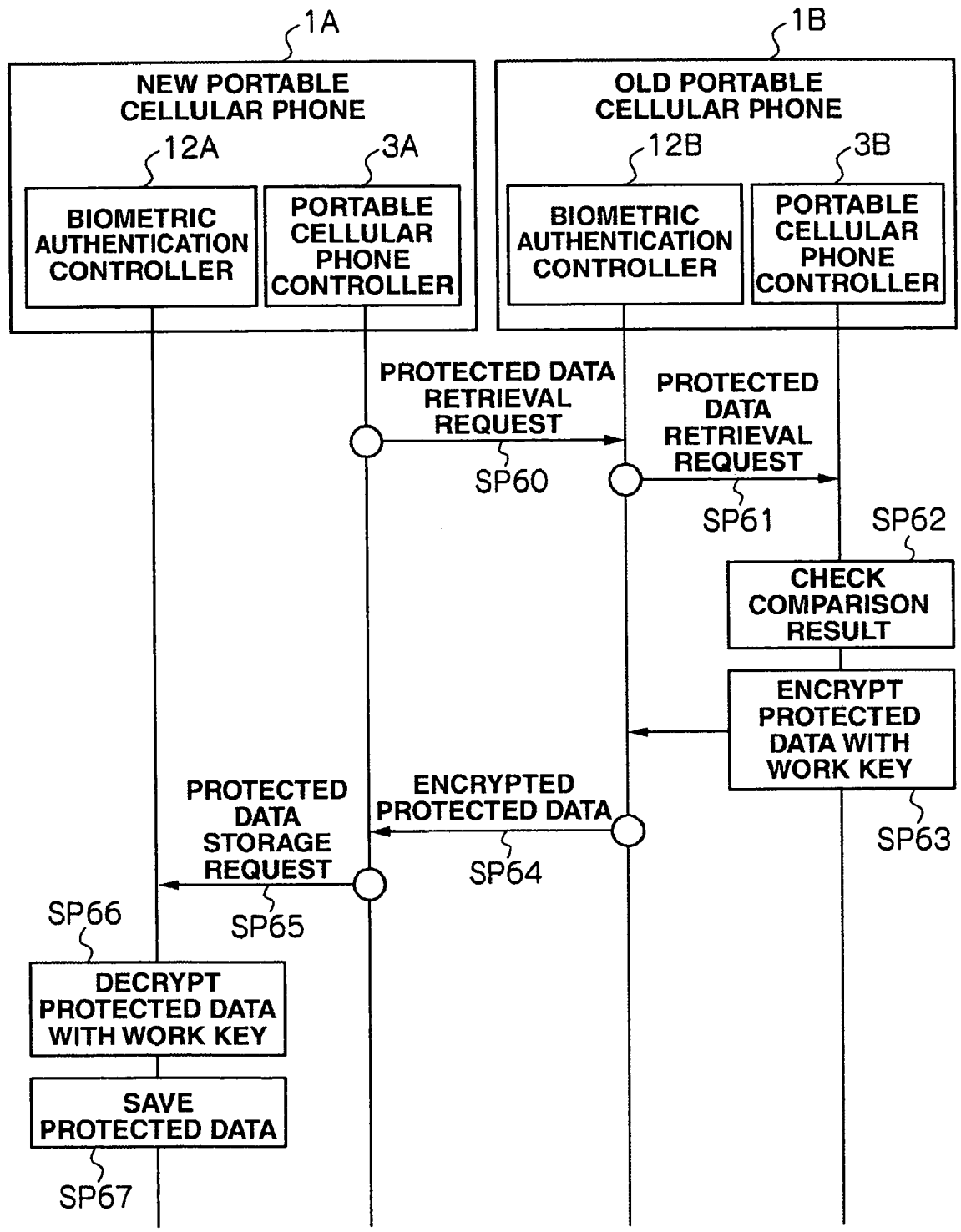

COMMUNICATION SYSTEM, METHOD FOR TRANSFERRING INFORMATION, AND INFORMATION-COMMUNICATION DEVICE

CROSS-REFERENCES TO RELATED APPLICATIONS

This application claims the benefit of priority from Japanese Application No. 2007-223568 filed on Aug. 30, 2007, the disclosure of which is also entirely incorporated herein by reference.

TECHNICAL FIELD

The invention relates generally to a communication system, method for transferring information, and information-communication device, and is suitable for application in an information-communication device, such as a portable cellular phone, equipped with a biometric authentication feature.

BACKGROUND

Recently, the idea of equipping a portable cellular phone with a biometric authentication feature has been suggested (JP2007-86846 A), and such portable cellular phones equipped with biometric authentication features have actually emerged. In such portable cellular phones, users register their biometric patterns, e.g., fingerprint patterns, in advance; the aforementioned biometric patterns are compared with user's biometric pattern obtained through a biometric sensor provided in the portable cellular phone in order to check whether or not the biometric pattern matches; and when the user's identity is verified, usage authority is given to the user.

SUMMARY

User's biometric pattern registered in a portable cellular phone equipped with such a biometric authentication feature is important private information, so there would be a security problem if such private information could be transferred to other such portable cellular phones.

For example, when replacing a portable cellular phone equipped with a biometric authentication feature with another portable cellular phone equipped with the same feature, some sort of measure is necessary as a means for transferring user's biometric pattern data registered in the old portable cellular phone to the new portable cellular phone.

An object of the present invention is to provide a communication system, method for transferring information, and information-communication device that are capable of transferring a biometric pattern stored in an information-communication device safely and securely to another information-communication device.

In a communication system according to the present invention, a first information-communication device generates first biometric pattern used for a comparison based on user's biometric information retrieved by a biometric sensor, and sends the generated first biometric pattern to a second information-communication device. The second information-communication device compares the first biometric pattern sent from the first information-communication device with second biometric pattern, which is user's biometric pattern stored in memory, and sends the second biometric pattern to the first information-communication device when the compared biometric pattern matches. The first information-communication device then stores the second biometric pattern sent from the second information-communication device.

Other aspects and advantages of the invention will be apparent from the following description and the appended claims.

BRIEF DESCRIPTION OF THE DRAWINGS

FIG. 4A-4B are sequence diagrams showing an example of registered biometric pattern transfer processing.

FIG. 6 is a sequence diagram showing an example of protected data transfer processing.

DETAILED DESCRIPTION

An embodiment of the present invention will be described with reference to the attached drawings. Incidentally, as an example, the present embodiment will be described for the situation where the information-communication device is a portable cellular phone.

(1) Configuration of Portable Cellular Phone

Figure 1:
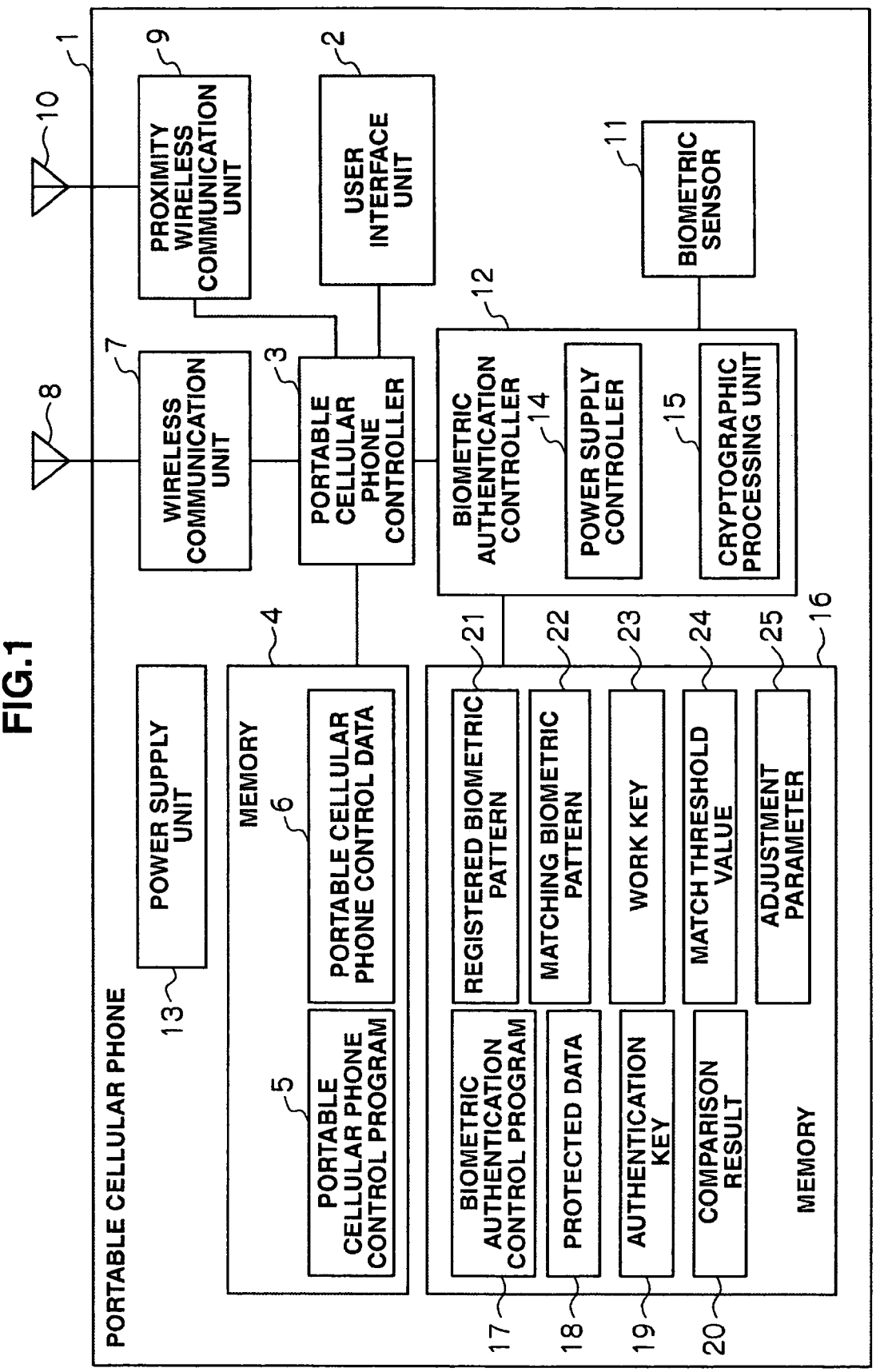
FIG. 1 is a block diagram showing a configuration example of a portable cellular phone.

FIG. 1 shows an example of a portable cellular phone equipped with a biometric authentication feature. A liquid crystal panel for displaying various information and a user interface unit 2 consisting of plural operating elements, such as buttons, are provided on the casing surface of this portable cellular phone 1. When an operating element in the user interface unit 2 is operated, operation information based on the operation is sent to a portable cellular phone controller 3.

The portable cellular phone controller 3 is a main CPU (Central Processing Unit) conducting the operational control of the entire portable cellular phone 1, and executes the required control processing based on the operation information provided by the user interface unit 2, portable cellular phone control program 5 stored in a first memory 4, and portable cellular phone control data 6. The portable cellular phone controller 3 makes the liquid crystal panel of the user interface unit 2 display a necessary GUI (Graphical User Interface) screen based on the aforementioned operation information, the portable cellular phone control program 5, and the portable cellular phone control data 6.

Under the control of the portable cellular phone controller 3, a wireless communication unit 7 executes predetermined signal processing, such as modulation processing or amplification processing, on sound signals sent from a microphone (not shown) during a phone call; and sends wireless communication signals generated in the above step to a base station via a first antenna 8 for wireless communication. Also, the wireless communication unit 7 receives the wireless communication signals sent from the base station via the first antenna 8 during a phone call; executes predetermined signal processing, such as modulation processing or amplification processing, on the received wireless communication signals; and sends generated sound signals to a speaker (not shown). Thus, sound based on the aforementioned sound signals is output from the speaker.

The proximity wireless communication unit 9 is an interface compliant with a predetermined proximity wireless communication standard, such as Bluetooth (registered trademark) or infrared-ray communication, and under the control of the portable cellular phone controller 3, the proximity wireless communication unit 9 performs proximity wireless communication with an external device via a second antenna 10 for wireless communication by using a protocol complying with the aforementioned proximity wireless communication standard.

The biometric sensor 11 consists of a small biometric sensor, such as fingerprint sensor or finger vein sensor, and is arranged in a predetermined location on the casing surface of the portable cellular phone 1. A user's biometric information obtained from this biometric sensor 11 is provided to a biometric authentication controller 12.

The biometric authentication controller 12 is provided with: a power supply controller 14 controlling the drive voltage distributed from a power supply unit 13 to the biometric sensor 11; and a cryptographic processing unit 15. The cryptographic processing unit 15 has a feature of, when transferring registered biometric pattern data or the like to and from another portable cellular phone 1 in the manner described later below, encrypting and decrypting the data. The biometric authentication controller 12 then executes, under the control of the portable cellular phone controller 3, various processing relating to the biometric authentication in accordance with a biometric authentication program 17 stored in a second memory 16.

The second memory 16 consists of nonvolatile memory, such as flash memory, or volatile memory, such as RAM (Random Access Memory). A storage area provided by the second memory 16 is used as a tamper-resistant area accessible only by a dedicated command. Other than the biometric authentication control program 17, an authentication key 19, protected data 18, a comparison result 20, a registered biometric pattern 21, matching biometric pattern 22, a work key 23, a match threshold value 24, and an adjustment parameter 25 (all described later below) are stored in this tamper-resistant area.

Hereinafter, information, such as image data of a fingerprint image output from the biometric sensor 11, is referred to as biometric information; a characteristic pattern extracted from the biometric information based on a specific algorithm is referred to as biometric pattern; biometric pattern held in the second memory 16 is referred to as registered biometric pattern; and biometric pattern generated from biometric information on a target person is referred to as matching biometric pattern.

(2) Flow of Biometric Authentication Processing in Portable Cellular Phone

Figure 2:
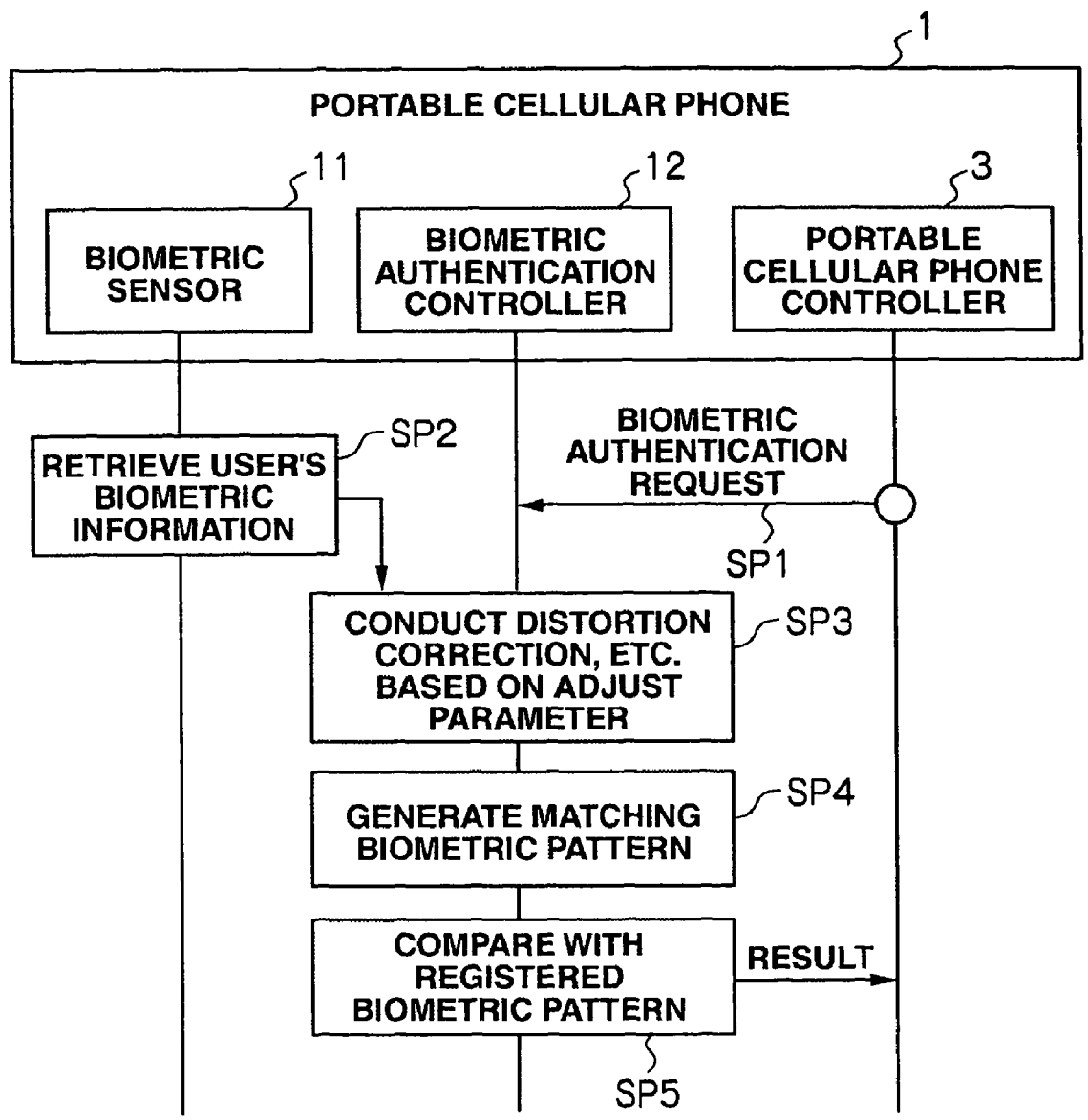
FIG. 2 is a sequence diagram showing an example of biometric authentication processing in the portable cellular phone in FIG. 1.

FIG. 2 shows an example of biometric authentication processing in the portable cellular phone 1. In the biometric authentication, the portable cellular phone controller 3 provides the biometric authentication controller 12 with a biometric authentication request (SP1). If the biometric authentication request is provided, the power supply controller 14 (shown in FIG. 1) in the biometric authentication controller 12 applies a drive voltage to the biometric sensor 11. As a result, the biometric information on a target person is obtained by the biometric sensor 11, and this biometric information is sent to the biometric authentication controller 12 (SP2).

The biometric authentication controller 12 performs predetermined adjustment processing, such as distortion correction, on biometric information sent from the biometric sensor 11 by using the adjustment parameter 25 (shown in FIG. 1) stored in the second memory 16 (SP3). Also, based on the post-adjustment processing biometric information, the biometric authentication controller 12 generates matching biometric pattern 22 (shown in FIG. 1) of the target person in accordance with a predetermined algorithm (SP4); compares the generated matching biometric pattern 22 with the registered biometric pattern 21 (shown in FIG. 1) stored in the second memory 16; and reports the result of the comparison to the portable cellular phone controller 3 (SP5).

Figure 3:
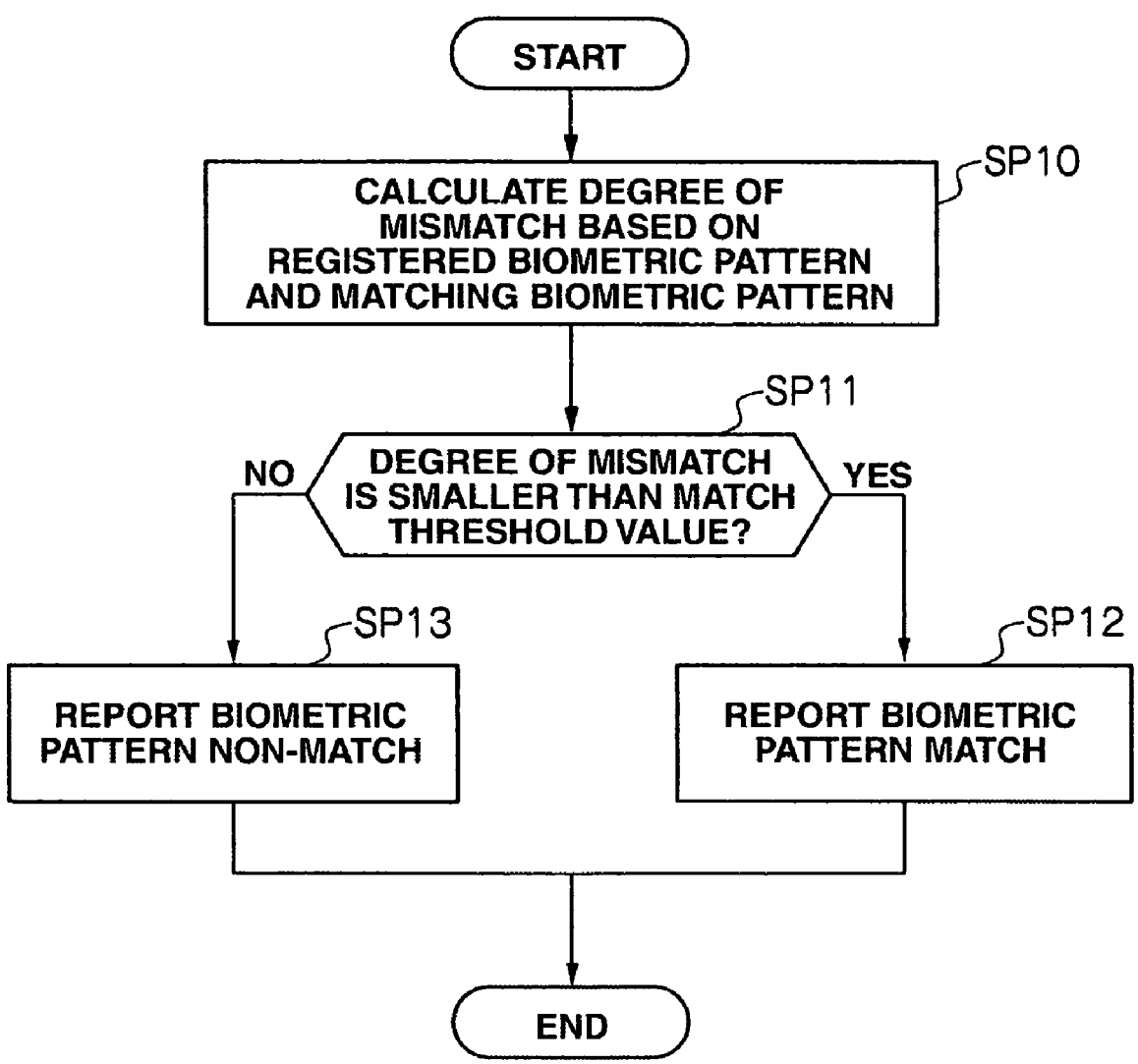
FIG. 3 is a flowchart illustrating a detailed example of comparison processing in FIG. 2.

FIG. 3 shows an example of specific processing steps in the biometric authentication controller 12, relating to comparison processing performed in step SP5 in the aforementioned biometric authentication processing.

The biometric authentication controller 12 starts this comparison processing when it reaches step SP5 in the biometric authentication processing, and it firstly calculates the degree of mismatch between the registered biometric pattern 21 and the matching biometric pattern 22 by using a predetermined algorithm (SP10).

Next, the biometric authentication controller 12 judges whether or not the degree of mismatch obtained by the calculation is smaller than the match threshold value 24 (shown in FIG. 1) stored beforehand in the second memory 16 (SP11).

If a positive result is obtained in this judgment, the biometric authentication controller 12 reports to the portable cellular phone controller 3 that the biometric pattern matches (SP12), and then terminates this comparison processing. Accordingly, the portable cellular phone controller 3 executes processing such as unlocking the portable cellular phone 1.

Meanwhile, if a negative result is obtained in this judgment, the biometric authentication controller 12 reports to the portable cellular phone controller 3 that the biometric pattern does not match (SP13), and then terminates this comparison processing. Accordingly, the portable cellular phone controller 3 makes the liquid crystal panel of the user interface unit (shown in FIG. 1) display an error message advising that the biometric pattern does not match.

(3) Registered Biometric Pattern Transfer Feature

Next, a registered biometric pattern transfer feature provided in the portable cellular phone 1 will be described.

The portable cellular phone 1 is equipped with a registered biometric pattern transfer feature where a registered biometric pattern 21 registered in a previous portable cellular phone (hereinafter referred to as "old portable cellular phone") 1 can be transferred safely and securely to a new portable cellular phone (hereinafter referred to as "new portable cellular phone") 1 when, for example, a user replaces a portable cellular phone 1 with another portable cellular phone.

In the transfer processing for the registered biometric pattern 21 using the registered biometric pattern transfer feature, the matching biometric pattern 22 of a target person is generated in the old portable cellular phone 1, and this matching biometric pattern 22 is compared with the registered biometric pattern 21 in the new portable cellular phone 1. One of the characteristic features of this transfer processing is that, if the user's identity is verified (hereinafter referred to as "biometric pattern match"), the registered biometric pattern 21 is encrypted and sent from the old portable cellular phone 1 to the new portable cellular phone 1.

FIG. 4A-4B shows an example of the transfer processing (hereinafter referred to as the "registered biometric pattern transfer processing") for the registered biometric pattern 21 in a portable cellular phone system consisting of two portable cellular phones 1. Hereinafter, components relating to the new portable cellular phone 1 will be respectively numbered with the suffix "A" appended to the same reference numerals as those used in FIG. 1, and components relating to the old portable cellular phone 1 will be respectively numbered with the suffix "B" appended to the same reference numerals as those used in FIG. 1.

In this registered biometric pattern transfer processing, first, the biometric authentication controller 12A of the new portable cellular phone 1A and the biometric authentication controller 12B of the old portable cellular phone 1B exchange predetermined identification data, such as their vendor names or product numbers, by using proximity wireless communication via the portable cellular phone controllers 3A, 3B and the proximity wireless communication units 9A, 9B, and thereby perform mutual authentication processing where the old and new portable cellular phones 1B, 1A can mutually judge whether or not the other portable cellular phone is an eligible portable cellular phone. Other than exchanging the identification data, the biometric authentication controller 12A of the new portable cellular phone 1A and the biometric authentication controller 12B of the old portable cellular phone 1B exchange their second memories 16A, 16B and work keys 23A, 23B (shown in FIG. 1) with each other, and thereby perform work key share processing whereby their work keys 23A, 23B can be shared between the new portable cellular phone 1A and the old portable cellular phone 1B (SP20). Here, the work keys 23A, 23B may newly be generated during the work key share processing if those keys are not stored in the second memory 16A, 16B.

When exchanging the identification data and work keys, the biometric authentication controller 12A of the new portable cellular phone 1A and the biometric authentication controller 12B of the old portable cellular phone 1B encrypt the identification data and work keys 23A, 23B in the cryptographic processing units 15A, 15B (shown in FIG. 1) by using authentication keys 19A, 19B (shown in FIG. 1) stored beforehand in the second memory 16A, 16B.

The authentication keys 19A, 19B and work keys 23A, 23B may be keys used in common key cryptography, such as DES (Data Encryption Standard) or AES (Advanced Encryption Standard), or keys used in public key cryptography, such as the RSA method (Rivest-Shamir-Adleman method) or ECC (Error Correction Code) method. Also, the systems for the mutual authentication processing and work key share processing may be based on either common key cryptography or public key cryptography.

Next, the biometric authentication controller 12A of the new portable cellular phone 1A and the biometric authentication controller 12B of the old portable cellular phone 1B encrypt and exchange their adjustment parameters 25A, 25B stored beforehand in the respective second memories 16A, 16B by using the work keys 23A, 23B shared in step SP20, and thereby share their adjustment parameters 25A, 25B between the new portable cellular phone 1A and the old portable cellular phone 1B (SP21).

Figure 7A:
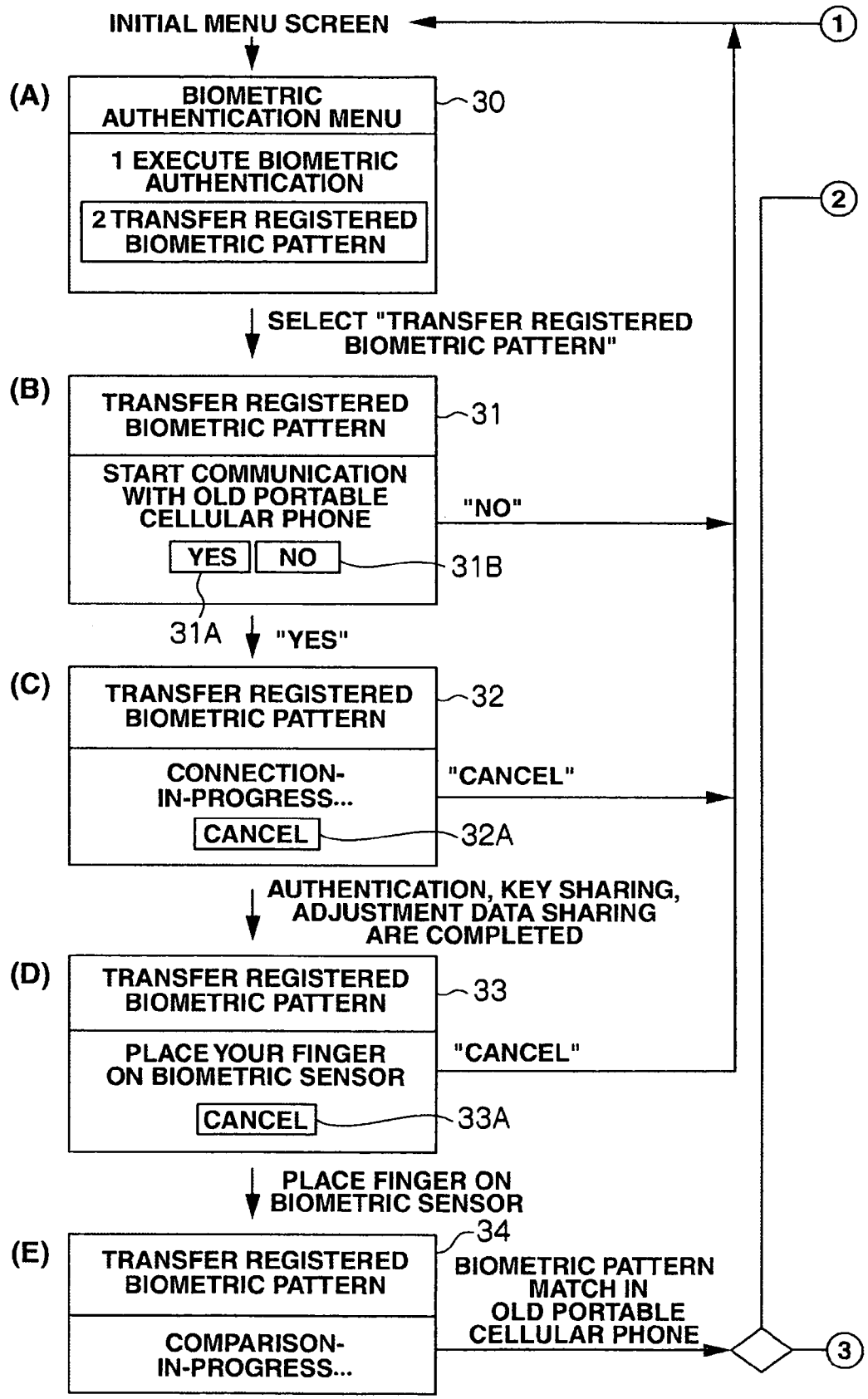
FIG. 7A-7C are diagrams showing an example of screen transition in registered biometric pattern transfer processing.

The portable cellular phone controller 3A of the new portable cellular phone 1A makes the liquid crystal panel of the user interface unit 2A display the instruction screen 33 shown in FIG. 7A(D), and also sends matching biometric pattern generation request to the biometric authentication controller 12A (SP22). When receiving this matching biometric pattern generation request, the power supply controller 14A of the biometric authentication controller 12A applies a drive voltage to the biometric sensor 11A. Accordingly, biometric information on a target person is obtained by the biometric sensor 11, and this biometric information is provided to the biometric authentication controller 12A (SP23).

The biometric authentication controller 12A performs predetermined adjustment processing, such as distortion correction, on the biometric information provided from the biometric sensor 11A by using either or both of the adjustment parameters 25A, 25B shared in step SP21 (SP24); and generates matching biometric pattern 22A based on the post-adjustment processing biometric information (SP25).

When the biometric authentication controller 12A cannot perform the adjustment processing on the biometric information by using the adjustment parameter 85 any reason, such as the biometric sensors 11A and 11B are incompatible with each other, it is preferable that the biometric authentication controller 12A stops the biometric authentication processing and makes the liquid crystal panel of the user interface unit 2 display an error message advising that the processing is cancelled. Identification data for identifying the compatibilities of the biometric sensors 11A, 11B may be included in the adjustment parameter 85, and the biometric authentication controller 12A may determine the compatibilities of the sensors 11A, 11B by using the identification data included in the adjustment parameter 85; and may judge whether the biometric authentication processing should be continued or cancelled.

While the biometric authentication controller 12A temporally stores the generated matching biometric pattern 22A in the second memory 16A, it also encrypts the data of this matching biometric pattern 22A in the cryptographic processing units 15A by using either or both of the shared work keys 23A, 23B (SP26) and sends the obtained encrypted matching biometric pattern data to the old portable cellular phone 1B via the proximity wireless communication unit 9A (SP27).

When receiving the encrypted matching biometric pattern data via the proximity wireless communication unit 9B, the portable cellular phone controller 3B of the old portable cellular phone 1B transfers this encrypted matching biometric pattern data to the biometric authentication controller 12B along with a comparison request (SP28).

When the comparison request is provided, the biometric authentication controller 12B decrypts the encrypted matching biometric pattern data by using either or both of the shared work keys 23A, 23B (SP29). The biometric authentication controller 12B compares the matching biometric pattern 22A obtained by the decryption with the registered biometric pattern 21B stored in the second memory 16B; and reports a comparison result 20B (shown in FIG. 1) to the portable cellular phone controller 3B. Furthermore, the biometric authentication controller 12B temporally stores the comparison result 20B in the second memory 16B (SP30). The portable cellular phone controller 3B then sends the comparison result to the new portable cellular phone 1A via the proximity wireless communication unit 9B (SP31).

When receiving the comparison result 20B via the proximity wireless communication unit 9B, the portable cellular phone controller 3A of the new portable cellular phone 1A judges based on this comparison result whether or not the biometric pattern compared in step SP30 matches. If the portable cellular phone controller 3A recognizes that the biometric pattern does not match (i.e. the user's identity is not verified), it makes the liquid crystal panel of the user interface unit 2A display an error message advising that the biometric pattern does not match.

Meanwhile, if the portable cellular phone controller 3A recognizes based on the comparison result 20B that biometric pattern compared in step SP30 matches, it sends a transfer request of the registered biometric pattern 21B (hereinafter referred to as the "registered biometric pattern transfer request") to the old portable cellular phone 1B via proximity wireless communication unit 9A (SP32).

When receiving the registered biometric pattern transfer request, the portable cellular phone controller 3B of the old portable cellular phone 1B transfers this registered biometric pattern transfer request to the biometric authentication controller 12B (SP33). When the registered biometric pattern transfer request is provided, the biometric authentication controller 12B checks the comparison result 20B in step SP30 stored in the second memory 16B (SP34).

Only when the biometric pattern compared in step SP30 matches, the biometric authentication controller 12B encrypts the registered biometric pattern 21B stored in the second memory 16B in the cryptographic processing units 15B by using either or both of the shared work keys 23A, 23B; and sends the obtained encrypted registered biometric pattern data to the portable cellular phone controller 3B via the proximity wireless communication unit 9B (SP35). The portable cellular phone controller 3B then sends the encrypted registered biometric pattern data to the new portable cellular phone 1A by means of proximity wireless communication via the proximity wireless communication unit 9B (SP36).

When receiving the encrypted registered biometric pattern data, the portable cellular phone controller 3A of the new portable cellular phone 1A transfers this encrypted registered biometric pattern data to the biometric authentication controller 12A along with a registered biometric pattern storage request (SP37).

When the registered biometric pattern storage request is provided, the biometric authentication controller 12A decrypts the encrypted registered biometric pattern data in the cryptographic processing units 15A by using either or both of the shared work keys 23A, 23B (SP38). The biometric authentication controller 12A compares the decrypted registered biometric pattern 21B with the matching biometric pattern 22A temporally stored in the second memory 16A in step SP25 (SP39); and stores this registered biometric pattern 21B in the second memory 16A only when the compared biometric pattern matches (SP40).

Meanwhile, the feature of deleting the registered biometric pattern 21B remaining in the old portable cellular phone 1B in accordance with a user's request is also provided in the registered biometric pattern transfer feature. If a user selects the deletion of the registered biometric pattern 21B, the deletion processing for the aforementioned registered biometric pattern 21B will be performed in accordance with, for example, steps shown in FIG. 5.

More specifically, if the deletion of the registered biometric pattern 21B is selected after the registered biometric pattern transfer processing described above with reference to FIG. 4A-4B are finished, the portable cellular phone controller 3A of the new portable cellular phone 1A sends a deletion command generation request to the biometric authentication controller 12A (SP50).

When receiving the deletion command generation request, the biometric authentication controller 12A generates a deletion command; encrypts the deletion command by using either or both of the shared work keys 23A, 23B in FIG. 4A-4B; and sends the encrypted deletion command to the portable cellular phone controller 3A (SP51). The portable cellular phone controller 3A then sends this encrypted deletion command to the old portable cellular phone 1B via the proximity wireless communication unit 9A (SP52).

When receiving the encrypted deletion command, the portable cellular phone controller 3B of the old portable cellular phone 1B transfers this encrypted deletion command to the biometric authentication controller 12B (SP53). The biometric authentication controller 12B then decrypts the encrypted deletion command by using either or both of the shared work keys 23A, 23B in FIG. 4A-4B (SP54).

The biometric authentication controller 12B then checks the comparison result 20B stored in the second memory 16B in step SP30 in FIG. 4B (SP55). If the biometric pattern compared in step SP30 matches, the registered biometric pattern 21B registered in the old portable cellular phone 1B will have already been transferred to the new portable cellular phone 1A, so it will be safe to delete the registered biometric pattern 21B from the old portable cellular phone 1B.

As a result of checking the comparison result 20B in step SP55, if the biometric authentication controller 12B recognizes the biometric pattern compared in step SP30 matches, the biometric authentication controller 12B deletes the data of the registered biometric pattern 21B from the second memory 16B, provided that the delete command is an eligible (SP56).

Meanwhile, the feature of transferring protected data 18B, such as address book data, image data or music data, stored in the second memory 16B of the portable cellular phone 1B to the new portable cellular phone 1A in accordance with a user's request is also provided in the registered biometric pattern transfer feature. If a user selects the transfer of the protected data 18B to the new portable cellular phone 1A, protected data transfer processing for transferring the protected data 18B to the new portable cellular phone 1A will be performed in accordance with, for example, the steps shown in FIG. 6.

More specifically, if the transfer of the protected data 18B stored in the old portable cellular phone 1B to the new portable cellular phone 1A after the deletion processing for the registered biometric pattern described above with reference to FIG. 5 is finished, the portable cellular phone controller 3A of the new portable cellular phone 1A sends a protected data transfer request to the old portable cellular phone 1B via the proximity wireless communication unit 9A (SP60).

When receiving the protected data transfer request via the proximity wireless communication unit 9A, the portable cellular phone controller 3B of the old portable cellular phone 1B transfers this protected data transfer request to the biometric authentication controller 12B (SP61). When receiving the protected data transfer request, the biometric authentication controller 12B checks whether or not the biometric pattern compared in step SP30 matched, with reference to the comparison result 20B stored in the second memory 16B in step SP 30 in FIG. 4B (SP62).

Based on the comparison result 20B, if the biometric authentication controller 12B recognizes that the compared biometric pattern matches, it encrypts the protected data 18B stored in the second memory 16B in the cryptographic processing units 15B by using either or both of the shared work keys 23A, 23B in FIG. 4A-4B; and sends the obtained encrypted protected data to the portable cellular phone controller 3B (SP63). The portable cellular phone controller 3B then sends this encrypted protected data to the new portable cellular phone 1A via the proximity wireless communication unit 9B (SP64).

When receiving the encrypted protected data via the proximity wireless communication unit 9A, the portable cellular phone controller 3A of the new portable cellular phone 1A transfers the encrypted protected data to the biometric authentication controller 12A along with a protected data storage request (SP65).

When receiving the protected data storage request, the biometric authentication controller 12A decrypts the encrypted protected data in the cryptographic processing units 15B by using either or both of the shared work keys 23A, 23B in FIG. 4A-4B (SP66), and stores the obtained protected data in the second memory 16A (SP67).

(4) Screen Transition in Registered Biometric Pattern Transfer Processing

Figure 7B:
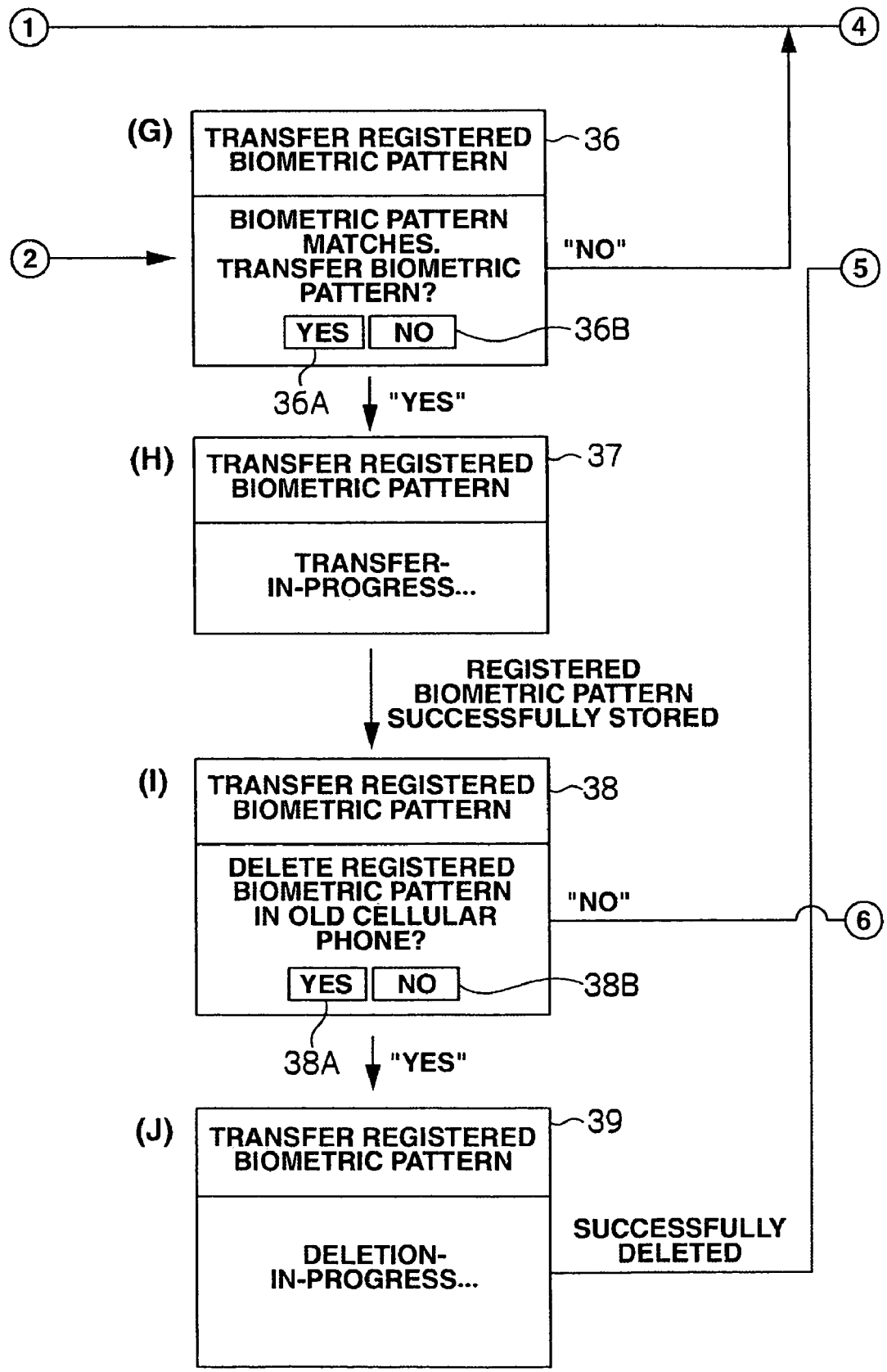
Figure 7C:
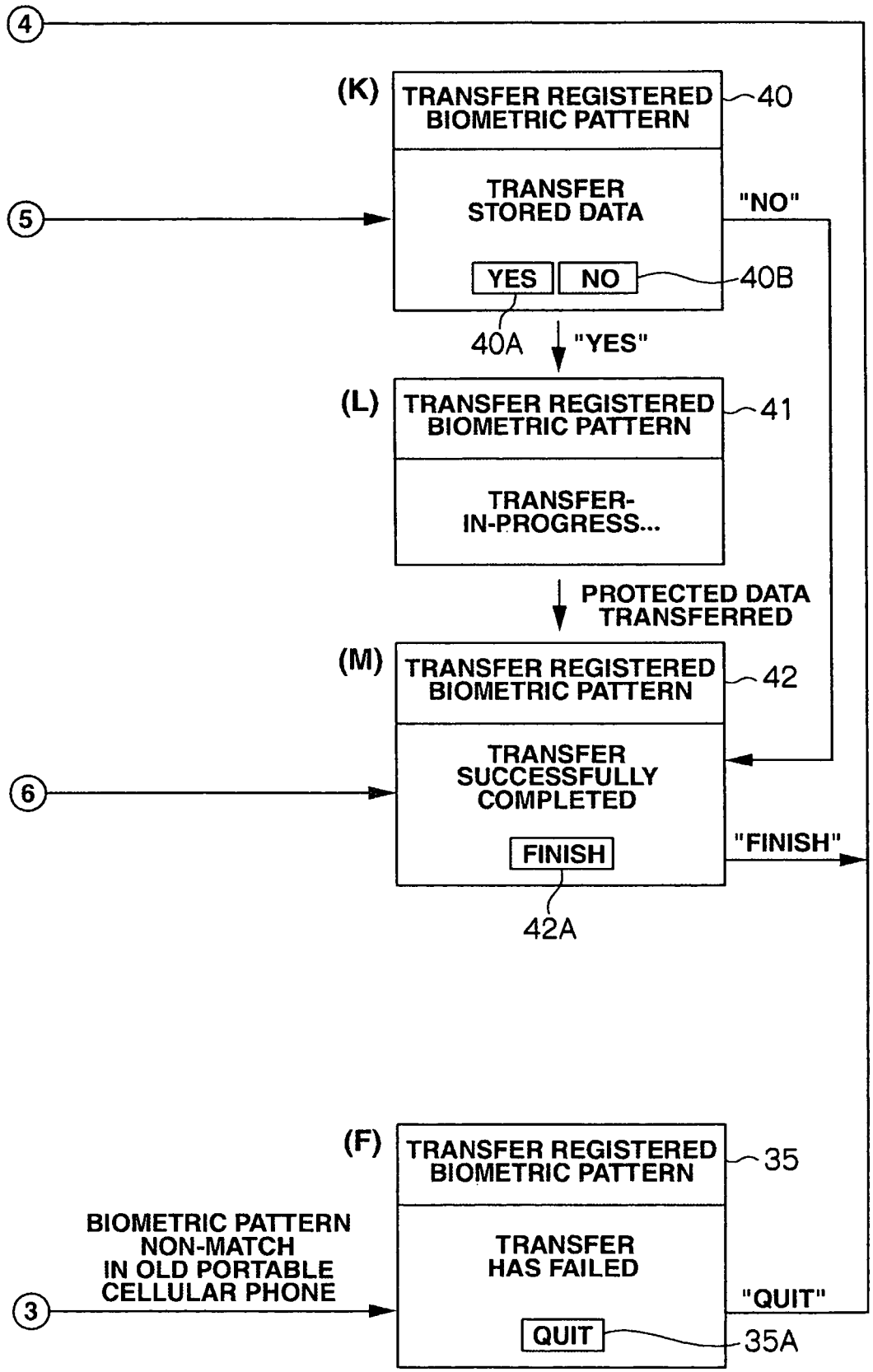

FIG. 7A-7C shows an example of the screen transitions of various screens displayed on the liquid crystal panel of the user interface unit 2A of the new portable cellular phone 1A, relating to the registered biometric pattern transfer processing.

In the present embodiment, a user selects a biometric authentication menu from an initial menu screen by operating the user interface unit 2A of the new portable cellular phone 1A, when transferring the registered biometric pattern 21B stored in the old portable cellular phone 1B to the new portable cellular phone 1A. As a result, a biometric authentication menu screen as shown in FIG. 7A(A) is displayed on the liquid crystal panel.

This biometric authentication menu screen is used for selecting, as processing to be executed by the new portable cellular phone 1A in relation to the biometric authentication feature, either biometric authentication execution processing ("1. EXECUTE BIOMETRIC AUTHENTICATION" in FIG. 7A-7C) for authenticating the user's biometric pattern or registered biometric pattern transfer processing ("2. TRANSFER BIOMETRIC PATTERN" in FIG. 7A(A) for transferring the data of the registered biometric pattern 21B stored in the old portable cellular phone 1B to the new portable cellular phone 1A. If a user selects the latter in the biometric authentication menu screen 30, the registered biometric pattern transfer processing is started, and the display screen switches to a communication initiation confirmation screen 31 shown in FIG. 7A(B).

This communication initiation confirmation screen 31 is used for confirming with a user if communication with the old portable cellular phone should be initiated. If the user presses the "NO" button 31B, the registered biometric pattern transfer processing is cancelled, and the display screen switches to the initial menu screen.

On the other hand, if the user presses the "YES" button 31A, the display screen switches to the connection-in-progress screen 32 shown in FIG. 7A(C). At the same time, the proximity wireless communication is performed between the new portable cellular phone 1A and the old portable cellular phone 1B; and the respective mutual authentication processing, work key share processing, and share processing for adjustment data described in steps SP20 and SP21 in FIG. 4A is performed between the new portable cellular phone 1A and the old portable cellular phone 1B.

Incidentally, if the user presses the "CANCEL" button 32A in the connection-in-progress screen 32, the registered biometric pattern transfer processing is cancelled, and the display screen switches to the initial menu screen.

Meanwhile, when the mutual authentication processing, the work key share processing, and the share processing for adjustment data is finished, the display screen switches to a prompt screen 33 shown in FIG. 7A(D). This prompt screen is a screen for advising the user to place their finger on the biometric sensor 11A of the new portable cellular phone 1A. If the user presses the "CANCEL" button 33A in the prompt screen 33, the registered biometric pattern transfer processing is cancelled, and the display screen switches to the initial menu screen.

On the other hand, if the user places their finger on the biometric sensor 11A of the new portable cellular phone 1A while the prompt screen 33 is displayed, the display screen switches to a comparison-in-progress screen 34 shown in FIG. 7A(E). At the same time, the comparison processing described in steps SP23-31 in FIG. 4A-4B is performed between the new portable cellular phone 1A and the old portable cellular phone 1B.

If the compared biometric pattern does not match, the display screen switches to a failure notification screen 35 shown in FIG. 7B(F). If the user presses a "QUIT" button 35A in the failure notification screen 35, the display screen switches to the initial menu screen.

Meanwhile, if the compared biometric pattern matches, the display screen switches to a registered biometric pattern transfer confirmation screen 36 shown in FIG. 7A(G). This registered biometric pattern transfer confirmation screen 36 is a screen for confirming with a user if the registered biometric pattern 21B stored in the old portable cellular phone 1B should be transferred to the new portable cellular phone 1A. If the user presses a "NO" button 36B in the registered biometric pattern transfer confirmation screen 36, the registered biometric pattern transfer processing is cancelled, and the display screen switches to the initial menu screen.

On the other hand, if the user presses an "YES" button 36A in the registered biometric pattern transfer confirmation screen 36, the display screen switches to a biometric-registered-data-transfer-in-progress screen 37 shown in FIG. 7B(H). At the same time, the proximity wireless communication is performed between the new portable cellular phone 1A and the old portable cellular phone 1B, and the transfer processing of the registered biometric pattern described in steps SP32-40 in FIG. 4B is executed.

When the transfer processing of the registered biometric pattern is finished, the display screen switches to a deletion confirmation screen 38 shown in FIG. 7B(I). The deletion confirmation screen 38 is a screen for confirming with a user whether or not the registered biometric pattern remaining in the old portable cellular phone 1B should be deleted. If the user presses the "NO" button 38B, the display screen switches to a transfer completion screen 42 shown in FIG. 7C(M).

Figure 5:
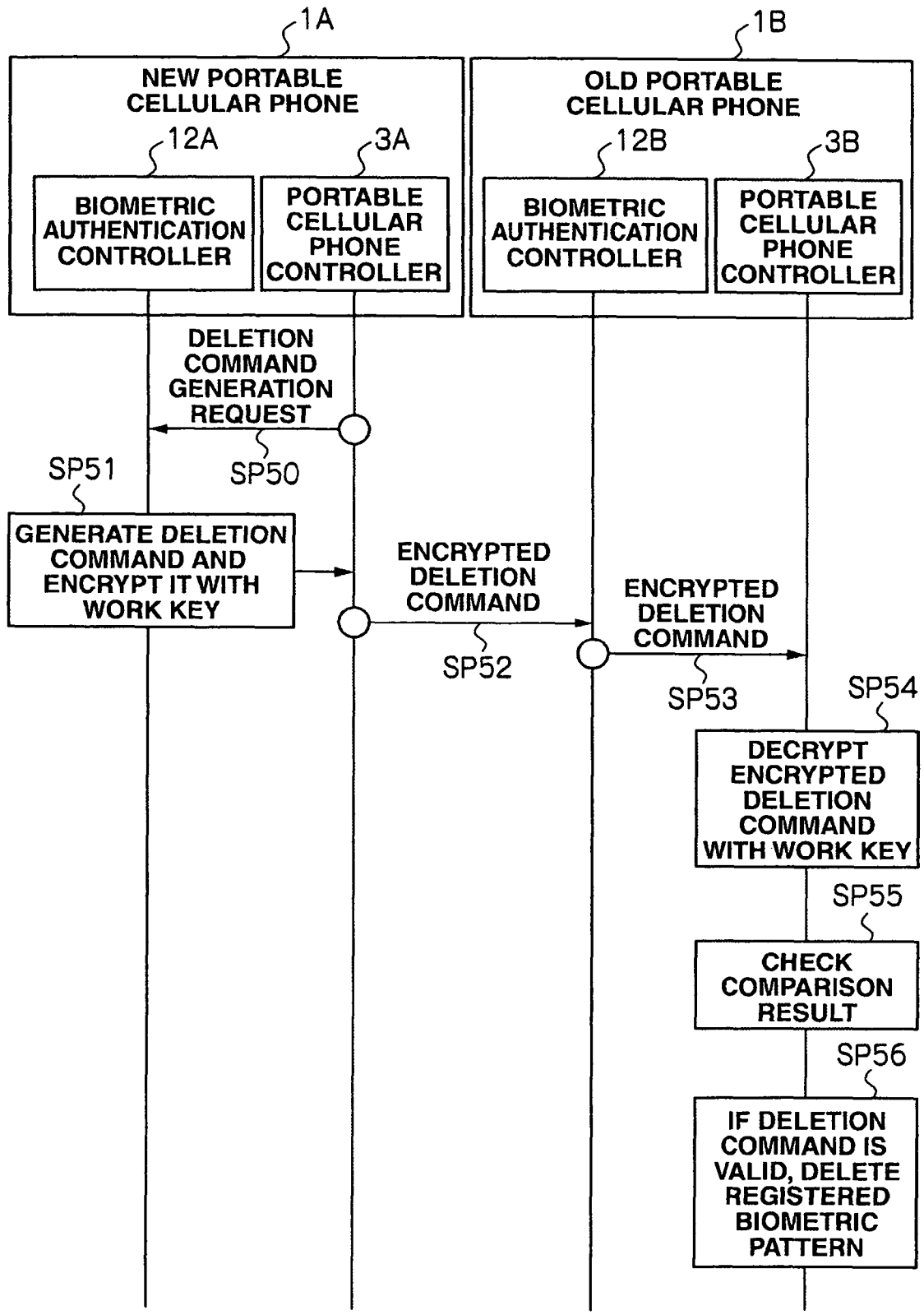
FIG. 5 is a sequence diagram showing an example of registered biometric pattern deletion processing.

Meanwhile, if the user presses the "YES" button 38A in the deletion confirmation screen 38, the display screen switches to a deletion-in-progress screen 39 shown in FIG. 7B(J). At the same time, the proximity wireless communication is performed between the new portable cellular phone 1A and the old portable cellular phone 1B, and the deletion processing for the registered biometric pattern 21B remaining in the old portable cellular phone 1B described in FIG. 5 is executed.

When the deletion processing for the registered biometric pattern 21B is finished, the display screen switches to a protected data transfer confirmation screen 40 shown in FIG. 7C(K). The protected data transfer confirmation screen 40 is a screen for confirming with a user whether the protected data 18B stored in the portable cellular phone 1B should be transferred to the new portable cellular phone 1A. If the user presses the "NO" button 40B, the display screen switches to the transfer completion screen 42 shown in FIG. 7C(M).

On the other hand, if the user presses the "YES" button 40A in the protected data transfer confirmation screen 40, the display screen switches to a transfer-in-progress screen 41 shown in FIG. 7C(L). At the same time, the proximity wireless communication is performed between the new portable cellular phone 1A and the old portable cellular phone 1B, and the transfer of the protected data 18B from the portable cellular phone 1B to the new portable cellular phone 1A described in FIG. 6 takes place.

When the transfer of the protected data 18B is finished, the display screen switches to the transfer completion screen 42 shown in FIG. 7C(M). If the user presses the "FINISH" button 42A in the transfer completion screen 42, the processing related to registered biometric pattern transfer processing is finished, and the display screen switches to the initial menu screen.

(5) Variation of the Present Embodiment

In the above embodiment, the invention has been described for the situation where a registered biometric pattern transfer feature is equipped in a portable cellular phone. However, the present invention does not limit the information-communication device to the portable cellular phone example, and the information-communication device may be a device such as an IC card. For example, the registered biometric pattern transfer feature may be included in an IC card issued by a bank or a credit company, and the user's registered biometric pattern registered in the IC card may be transferred to a portable cellular phone.

Figure 8:
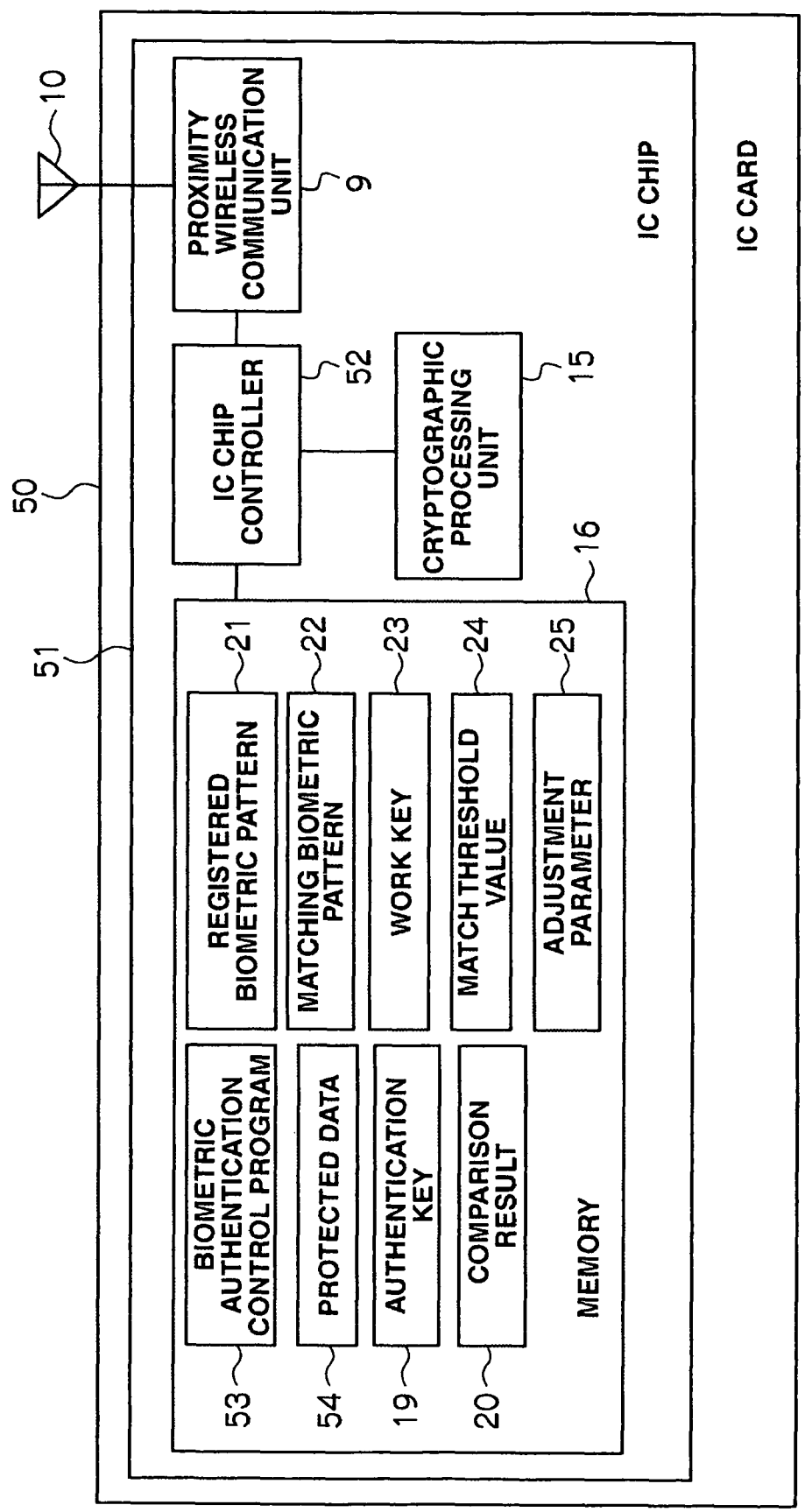
FIG. 8 is a block diagram showing a configuration example of an IC card.

FIG. 8 shows the configuration example of an IC card 50 in which a registered biometric pattern transfer feature is included. In FIG. 8, an IC chip controller 52 in an IC chip 51 mounted in the IC card 50 has a feature controlling proximity wireless communication performed with an external device via the proximity wireless communication unit 9; and a feature transferring a registered biometric pattern 21 stored in memory 16 to a portable cellular phone 1 in accordance with biometric authentication control program 53 stored in the memory 16 (hereinafter referred to as the "registered biometric pattern transfer feature").

The IC card is configured as above, so that the registered biometric pattern 21 registered in the IC card 50 or protected data 54 can be transferred to the portable cellular phone 1; and, after transferring the registered biometric pattern 21 from the IC card to the portable cellular phone 1, the data of the registered biometric pattern 21 remaining in the IC card can be deleted, by performing the same processing as those described with reference to FIGS. 4-6.

In the above embodiment, the invention has been described for the situation where the registered biometric pattern 21 is stored in the second memory 16, but the registered biometric pattern 21 may be stored in an IC card, such as a SIM (Subscriber Identity Module) card or a UIM (User Identity Module) card, in which user information is stored (hereinafter referred to as the "IC card"), removably contained in a portable cellular phone. Accordingly, a registered biometric pattern registered in a portable cellular phone can be transferred to another portable cellular phone only by replacing the IC card.

Figure 9:
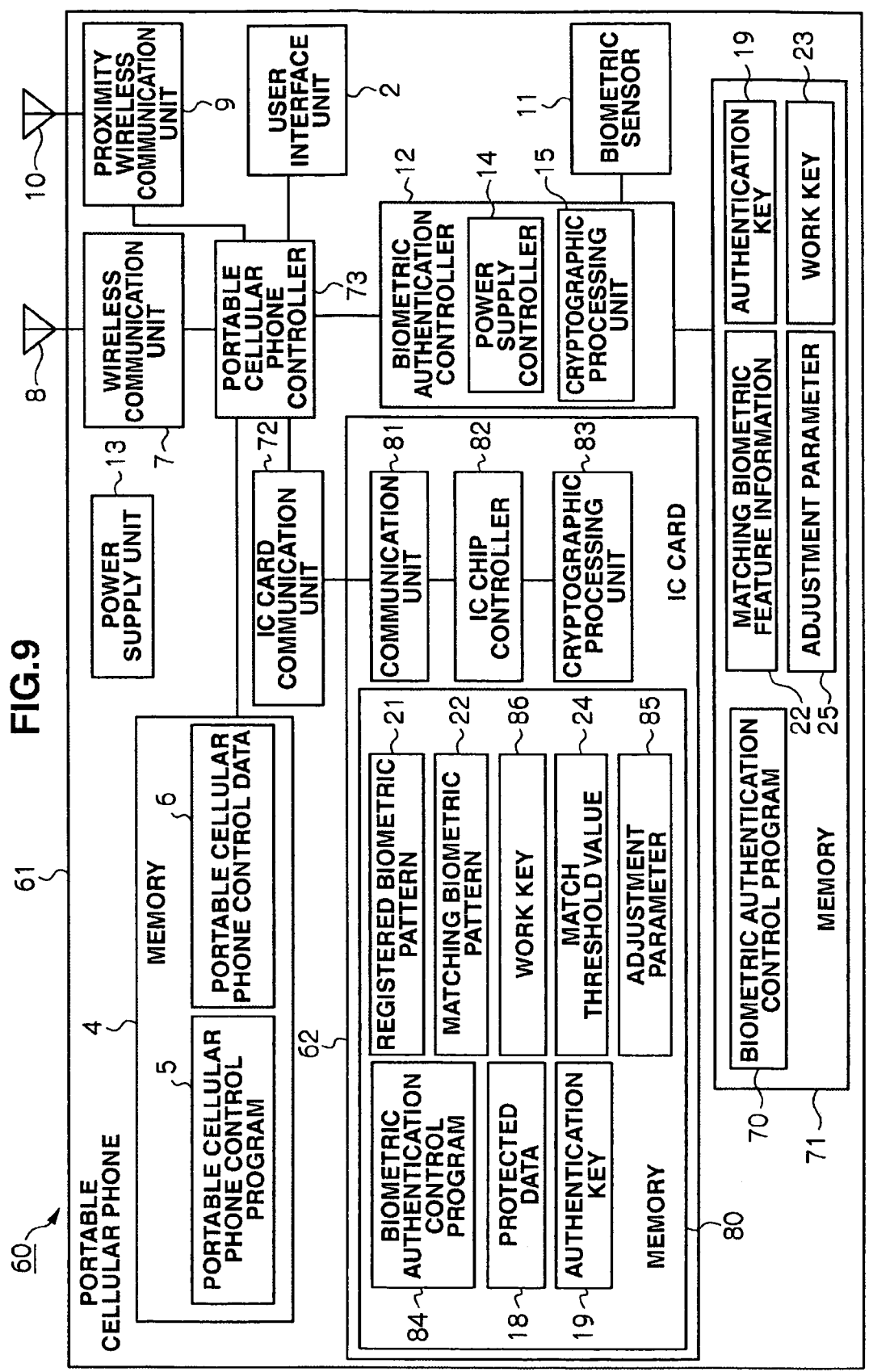
FIG. 9 is a block diagram showing a configuration example of a portable cellular phone system.

FIG. 9 shows a configuration example of a portable cellular phone system 60 consisting of a portable cellular phone 61 and IC card 62, for the situation where a registered biometric pattern 21 is stored in the IC card 62. Components the same as those in FIG. 1 will be numbered with the same reference numerals as those used in FIG. 1.

In the portable cellular phone system 60, the portable cellular phone 61 has the same configuration as that of the portable cellular phone 1 in FIG. 1 except that, of the various information stored in the second memory 16 of the portable cellular phone 1 in FIG. 1, a biometric authentication control program 70, matching biometric pattern 22, an authentication key 19, a work key 23 and an adjustment parameter 25 are stored in the second memory 71.

Incidentally, in the portable cellular phone system 60, as described later below, the portable cellular phone 61 generates only biometric pattern (registered biometric information 21 or matching biometric pattern 22), and performs the comparison of the registered biometric pattern 21 with the matching biometric pattern 22 within the IC card 62. Therefore, in the portable cellular phone system 60, the biometric authentication control program 70 stored in the second memory 71 of the portable cellular phone 61 differs from the biometric authentication program 17 in FIG. 1 in terms of having only a feature of generating the registered biometric pattern 21 or matching biometric pattern 22 and not having a feature of comparing the registered biometric pattern 21 with the matching biometric pattern 22.

An IC card communication unit 72 is an interface for communication with the IC card 62. Although not shown in FIG. 1, the portable cellular phone 1 in FIG. 1 also has a similar IC card communication unit.

The IC card 62 is provided with memory 80 consisting of nonvolatile memory and volatile memory; a communication unit 81 which is a communication interface with the portable cellular phone 1; an IC card controller conducting the operational control of the entire IC card 62; and a cryptographic processing unit 83 having the same feature as that of the cryptographic processing unit 15 in the biometric authentication controller 12 in FIG. 1.

Basically, information similar to the various information stored in the second memory 16 in the portable cellular phone 1 in FIG. 1 is stored in the memory 80 in the IC card 62. However, the biometric authentication control program 84 differs from the biometric authentication program 17 in FIG. 1 in terms of having a feature of comparing the registered biometric pattern 21 with the matching biometric pattern 22 and not having a feature of generating the registered biometric pattern 21 or the matching biometric pattern 22.

Consequently, in the portable cellular phone system 60, biometric pattern generated by the biometric authentication controller 12 in the portable cellular phone 61 is provided to the IC card via the IC card communication unit 72 under the control of the portable cellular phone controller 73; and then the biometric pattern is stored as a registered biometric pattern 21 in the memory 80 in the IC card 62 by the IC card controller 82.

The adjust parameter 85 stored in the memory 80 in the IC card 62 is an adjust parameter for the portable cellular phone 61 which generates the registered biometric pattern 21, and a work key 86 stored in the memory 80 is the work key for the IC card 62.

Figure 10:
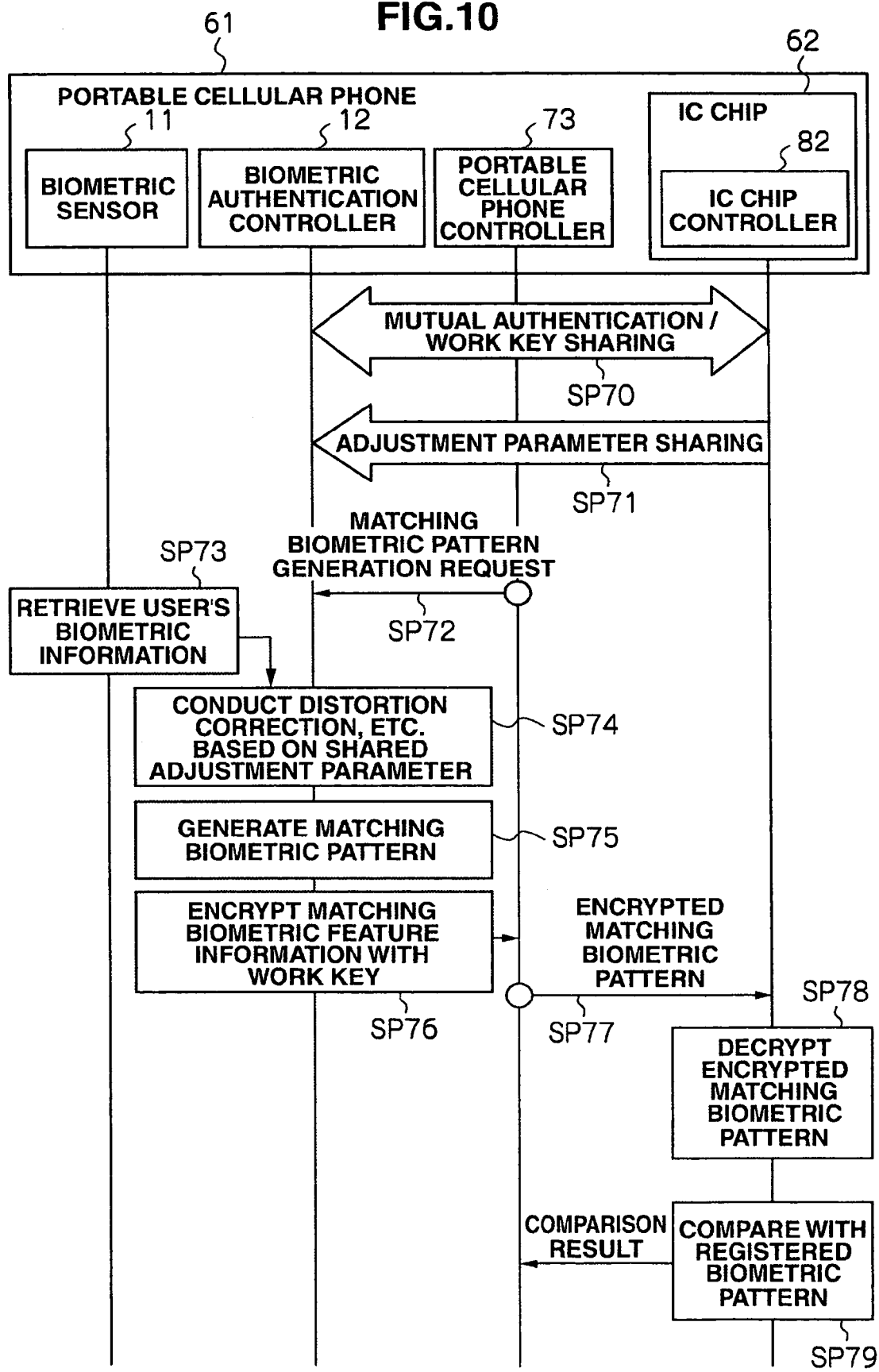
FIG. 10 is a sequence diagram showing an example of biometric authentication processing in the portable cellular phone system in FIG. 9.

FIG. 10 shows an example of biometric authentication processing performed when, for example, using the portable cellular phone 61, or reading out protected data 18 stored in the IC card 62, in the portable cellular phone system 60. In the portable cellular phone system 60, the registered biometric pattern 21 and protected data 18 are stored in the removable IC card 62 instead of the portable cellular phone 61, so a means for preventing unauthorized use of the portable cellular phone 61 or unauthorized access to the protected data 18 is necessary. Therefore, in the portable cellular phone system 60, the user's identity verification is performed whenever a user uses the portable cellular phone 61 or accesses the protected data 18.

In the biometric authentication processing, firstly the biometric authentication controller 12 in the portable cellular phone 61 and the IC card controller 82 in the IC card 62 perform mutual authentication processing and share processing for a work key 23 of the portable cellular phone 61 and a work key 86 of the IC card 62, which are similar to those in step SP20 in FIG. 4A, via the IC card communication unit 72 in the portable cellular phone 61 and the communication unit 81 in the IC card 62 (SP70). The IC card controller 82 in the IC card 62 then sends the adjustment parameter 85 stored in the memory 80 to the portable cellular phone 61 (SP71).

Next, in the same manner as described in steps SP23-25 in FIG. 4A, the user's matching biometric pattern 22 is generated in the biometric authentication controller 12 in the portable cellular phone 61 (SP73-75), the generated matching biometric pattern 22 is encrypted by the respective work keys 23 and 86 of the portable cellular phone 61 and the IC card 62, which are shared in step SP70 (SP76). Encrypted matching biometric pattern data obtained by the encryption is sent by the portable cellular phone controller 73 to the IC card 62 via the IC card communication unit 72 (SP77).

In step SP74, when performing predetermined adjustment processing, such as distortion correction, on biometric information sent from the biometric sensor 11 by using the adjustment parameter 85 obtained by the biometric authentication controller 12 from the IC card 62, the biometric authentication controller 12 may not be able to perform adjustment processing for a reason, such as the biometric sensor 11 being incompatible. In those cases, the biometric authentication controller 12 stops the biometric authentication processing and makes the liquid crystal panel of the user interface unit 2 display an error message advising that the processing has been cancelled. As a result, it is possible to prevent the execution of unauthorized biometric authentication processing when replacing the IC card 62 in a portable cellular phone which is incompatible with the biometric sensor 11. Identification data for identifying the compatibility of the biometric sensor 11 may be included in the adjustment parameter 85, and the biometric authentication controller 12 may determine the compatibility of the sensor 11 by using the identification data included in the adjustment parameter 85; and may judge whether the biometric authentication processing should be continued or cancelled.

When receiving the encrypted matching biometric pattern data via the communication unit 81, the IC card controller 82 in the IC card 62 decrypts the encrypted matching biometric pattern data by using the respective work keys 23 and 86 of the portable cellular phone 61 and the IC card 62, which are shared in step SP70 (SP78). The IC card controller 82 then compares the obtained biometric authentication pattern with the registered biometric pattern 22 stored in the memory 80, and sends the comparison result to the portable cellular phone 61 (SP79).

If the portable cellular phone controller 73 in the portable cellular phone 61 recognizes that the biometric pattern compared in step SP78 matches based on the comparison result, the portable cellular phone controller 73 removes the restriction on use of the portable cellular phone 62 or the access restriction on the protected data 18 stored in the IC card 62.

(6) Advantageous Effect of the Embodiment

As described above, according to the portable cellular phones 1, 61 in the present embodiment, a user's registered biometric pattern 21 registered in the old portable cellular phones 1B, 61 can be transferred safely and securely to the new portable cellular phones 1A, 61 when, for example, replacing the portable phones 1, 61.

In the above embodiment, the invention has been described for the situation where the second information-communication device in which user's biometric pattern is registered and the first information-communication device registered in the second information-communication device are both described as a portable cellular phone 1; or the first information-communication device and the second information-communication device are described as the portable cellular phone 1 and an IC card, respectively. However, the invention is not limited to this embodiment, and can also utilize, as the first and second information-communication devices, a wide variety of other information-communication devices, such as notebook-sized personal computers.

Furthermore, in the above embodiment, the invention has been described for the situation where a registered biometric pattern registered in the portable cellular phone 1B is deleted from the portable cellular phone 1B after performing the registered biometric pattern transfer processing for transferring the registered biometric pattern to a new portable cellular phone 1A, and then protected data 18 is transferred from the old portable cellular phone to the new portable cellular phone 1A. However, the invention is not limited to this embodiment, and also the processing for deleting the registered biometric pattern from the old portable cellular phone 1B and the processing for transferring the protected data 18 from the old portable cellular phone 1B to the new portable cellular phone 1A may be performed in reverse order.

As described above, according to the present invention, biometric pattern stored in an information-communication device can be transferred safely and securely to another information-communication device.

The foregoing invention has been described in terms of preferred embodiments. However, those skilled, in the art will recognize that many variations of such embodiments exist. Such variations are intended to be within the scope of the present invention and the appended claims.

Moreover, in the above embodiment, the invention has been described for the situation where the invention is applied in a communication system capable of transferring a biometric pattern stored in an information-communication device to another information-communication device. However, the invention is not limited to this embodiment, and also the invention may be widely applied in a communication system capable of transferring biometric information other than a biometric pattern stored in an information-communication device to another information-communication device.

What is claimed is:

1. A communication system comprising a first information-communication device and a second information-communication device, the first information-communication device including:
a first memory which stores user biometric feature information;
a first communication unit capable of communication with the second information-communication device;
a biometric sensor which retrieves user biometric information; and
a first biometric authentication controller generating first biometric feature information used for a comparison based on the user biometric information retrieved by the biometric sensor;

the second information-communication device including:
a second memory which stores user biometric feature information;
a second communication unit capable of communication with the first information-communication device; and
a second biometric authentication controller conducting biometric authentication by comparing the first biometric feature information with second biometric feature information stored in the second memory; wherein the first information-communication device generates the first biometric feature information based on the user biometric information retrieved by the biometric sensor, and sends the generated first biometric feature information to the second information-communication device by the first communication unit; wherein
the second information-communication device compares the first biometric feature information sent from the first information-communication device with the second biometric feature information stored in the second memory, and sends the second biometric feature information to the first information-communication device by the second communication unit when the compared biometric feature information matches; and wherein
the first information-communication device stores the second biometric feature information sent from the second information-communication device in the first memory.

2. The communication system according to claim 1, wherein
the first information-communication device holds a predetermined adjustment parameter relating to the biometric sensor, shares the adjustment parameter with the second information-communication device, and adjusts the biometric information retrieved by the biometric sensor by using the shared adjustment parameter.

3. The communication system according to claim 1, wherein:
the first and second information-communication devices perform mutual authentication and share cryptographic keys by the first and second communication units; wherein
the first information-communication device encrypts the first biometric feature information by using the cryptographic key and sends it to the second information-communication device; and wherein
the second information-communication device decrypts the first biometric feature information sent from the first information-communication device by using the cryptographic key, encrypts the second biometric feature information by using the cryptographic key when the compared biometric feature information matches, and sends the encrypted second biometric feature information to the first information-communication device.

4. The communication system according to claim 1, wherein
the first information-communication device temporally stores the first biometric feature information generated based on the user biometric information, compares the second biometric feature information sent from the second information-communication device With the temporally stored first biometric feature information, and, when the compared biometric feature information matches, stores the second biometric feature information sent from the second information-communication device in the second memory.

5. The communication system according to claim 1, wherein,
after storing the second biometric feature information sent from the second information-communication device in the first memory, the first information-communication device sends a request for deletion of the second biometric feature information to the second information-communication in accordance with an external instruction, and wherein
the second information-communication device deletes the second biometric feature information from the second memory in response to the request for deletion of the second biometric feature information, which is sent from the first information-communication device.

6. The communication system according to claim 1, wherein, after storing the second biometric feature information sent from the second information-communication device in the first memory, the first information-communication device sends a request for transfer of predetermined protected data to the second information-communication device; and wherein
the second information-communication device sends the protected data to the first information-communication device in response to the transfer request for the protected data, which is sent from the first information-communication device.

7. The communication system according to claim 1, wherein
the first and second information-communication devices are both portable cellular phones.

8. The communication system according to claim 1, wherein
the first information-communication device is a portable cellular phone; and wherein The second information-communication device is an IC card.

9. A method for transferring information in a communication system comprising first and second information-communication devices;
the first and second information-communication devices being respectively equipped with proximity wireless communication features for performing proximity wireless communication complying with a predetermined proximity wireless communication standard; wherein
the method comprises:
a first step in which the first information-communication device generates first biometric feature information used for a comparison based on user biometric information retrieved by the biometric sensor, encrypts the generated first biometric feature information, and sends it to the second information-communication device by the first communication unit;
a second step where the second information-communication device compares the first biometric feature information sent from the first information-communication device with the second biometric feature information consisting of stored registered user biometric feature information, encrypts the second biometric feature information when the compared biometric feature information matches, and sends the encrypted second biometric feature information to the first information-communication device by the second communication unit; and
a third step where the first information-communication device stores the second biometric feature information sent from the second information-communication device.

10. The method for transferring information according to claim 9, wherein:
the first and second information-communication devices hold a predetermined adjustment parameter relating to the biometric sensor; wherein,
in the first step, the adjustment parameter is shared between the first and second information-communication devices, and
the first information-communication device adjusts the biometric information retrieved by the biometric sensor by using at least the shared adjustment parameter of the first and/or second information-communication devices.

11. The method for transferring information according to claim 9, wherein:
in the first step, the first and second information-communication devices perform mutual authentication and share cryptographic keys between them by the proximity wireless communication, and the first information-communication device encrypts the first biometric feature information by using the cryptographic key and sends it to the second information-communication device; and wherein, in the second step, the second information-communication device decrypts the first biometric feature information sent from the first information-communication device by using the cryptographic key, encrypts the second biometric feature information by using the cryptographic key when the compared biometric feature information matches, and sends the encrypted second biometric feature information to the first information-communication device.

12. The method for transferring information according to claim 9, wherein:

in the first step, the first information-communication device temporally stores the first biometric feature information generated based on the user biometric information; and wherein, in the third step, the first information-communication device compares the second biometric feature information sent from the second information-communication device with the temporally stored first biometric feature information, and, when the compared biometric feature information matches, stores the second biometric feature information sent from the second information-communication device.

13. The method for transferring information according to claim 9, further comprising:

a fourth step where, after storing the second biometric feature information sent from the second information-communication device, the first information-communication device sends a request for deletion of the second biometric feature information to the second information-communication device; and a fifth step where the second information-communication device deletes the second biometric feature information in response to the request for deletion of the second biometric feature information, which is sent from the first information-communication device.

14. The method for transferring information according to claim 9, further comprising:

a sixth step where, after storing the second biometric feature information sent from the second information-communication device, the first information-communication device sends a request for transfer of predetermined protected data to the second information-communication device in accordance with an external instruction; and a seventh step where the second information-communication device transfers to the first information-communication device the protected data to the first information-communication device in response to the transfer request for the protected data, which is sent from the first information-communication device.

15. The method for transferring information according to claim 9, wherein:

the first and second information-communication devices are both portable cellular phones.

16. The method for transferring information according to claim 9, wherein:

the first information-communication device is a portable cellular phone; and wherein the second information-communication device is an IC card.

* * * * *